(12) United States Patent
Kawai

(10) Patent No.: US 6,525,759 B2
(45) Date of Patent: Feb. 25, 2003

(54) INDUCTION CHARGE MIRROR

(75) Inventor: Kiyoyuki Kawai, Yokosuka (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/793,988

(22) Filed: Feb. 28, 2001

(65) Prior Publication Data
US 2002/0051053 A1 May 2, 2002

(30) Foreign Application Priority Data
Nov. 2, 2000 (JP) .................................... 2000-336191

(51) Int. Cl.[7] .................................................. B41J 2/47
(52) U.S. Cl. .................................... 347/239; 347/255
(58) Field of Search ................................. 347/237, 239, 347/255; 348/764, 770, 771, 755; 359/221, 223, 224, 291

(56) References Cited

U.S. PATENT DOCUMENTS

| | | | |
|---|---|---|---|
| 5,583,688 A | 12/1996 | Hornbeck | 359/291 |
| 5,631,782 A | 5/1997 | Smith et al. | 359/871 |
| 5,696,619 A * | 12/1997 | Knipe et al. | 359/224 |
| 6,172,797 B1 * | 1/2001 | Huibers | 359/291 |

* cited by examiner

Primary Examiner—Hai Pham
(74) Attorney, Agent, or Firm—Pillsbury Winthrop LLP

(57) ABSTRACT

An induction charge mirror is provided which makes a rotation mirror which is operated under an electrostatic force hinge-free and achieves a greater aperture rate in a simpler structure and the easiness with which it is manufactured. To this end, a space is provided in an upper surface portion of the insulating substrate and surrounded at least its surface portion surrounded with an insulating material. A flat mirror conductor is tiltably set within the space. A transparent electrode and first and second fixed electrodes are provided. A means is provided for normally applying a first potential to the transparent electrode and, in order to switch the tilting angle of the mirror conductor, means are provided for alternately applying a second potential and third potential to the first and second fixed electrodes.

24 Claims, 8 Drawing Sheets

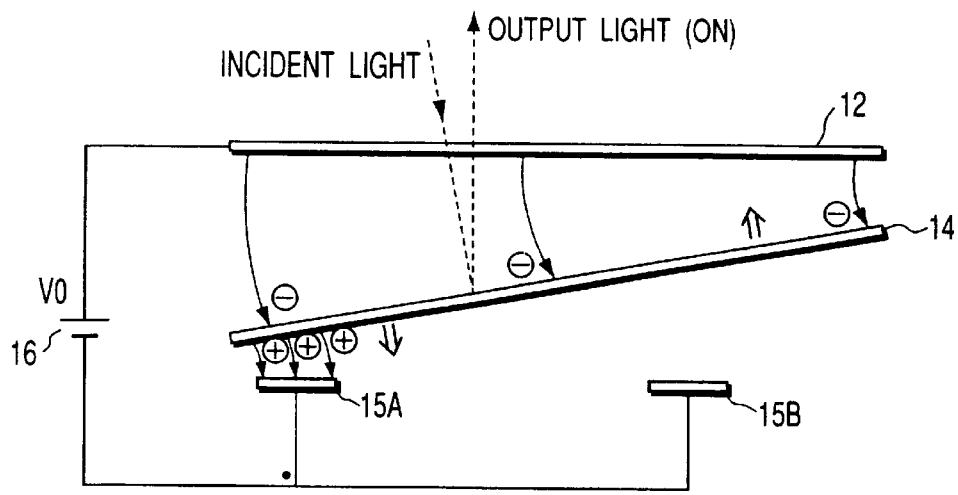
F I G. 8A
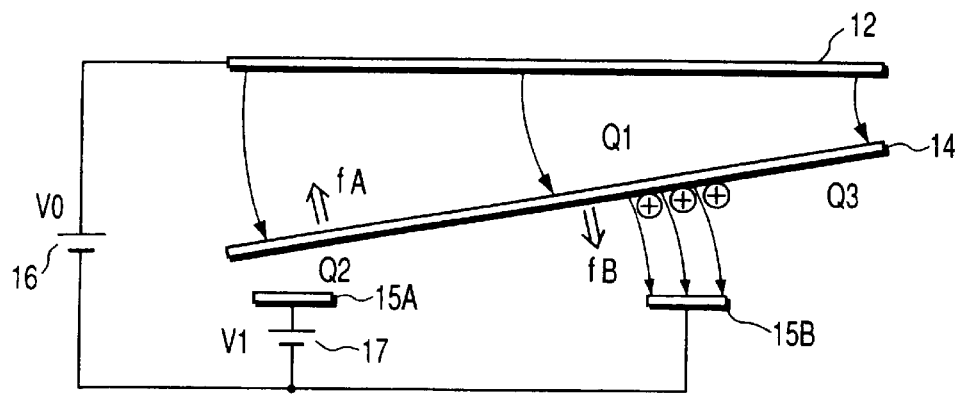
F I G. 8B
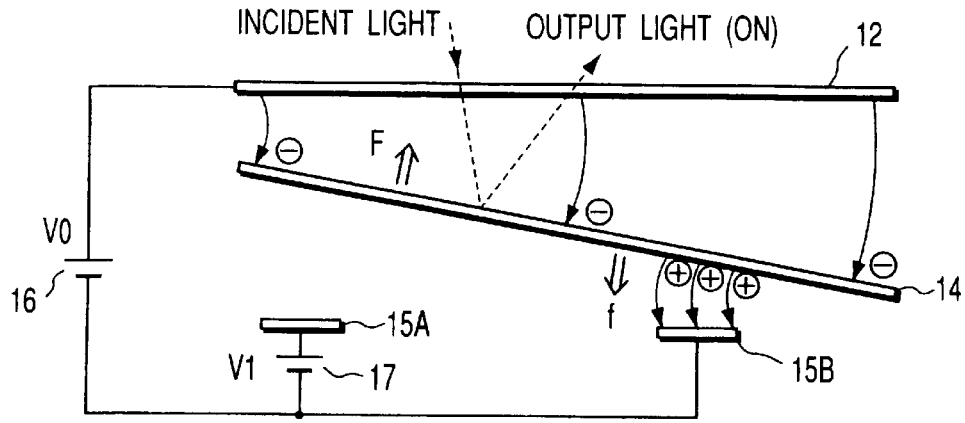
F I G. 8C

INDUCTION CHARGE MIRROR

CROSS-REFERENCE TO RELATED APPLICATIONS

This application is based upon and claims the benefit of priority from the prior Japanese Patent Application No. 2000-336191, filed Nov. 2, 2000, the entire contents of which are incorporated herein by reference.

BACKGROUND OF THE INVENTION

The present invention relates to an induction charge mirror effectively applicable to, for example, a digital micromirror device.

The digital micromirror device (DMD) is known as a spatial light modulator for controlling the micromirror by an electrostatic force.

Before explaining the features of a DMD structure, an explanation will be made below about one pixel (cell) of a spatial light modulator shown in U.S. Pat. No. 5,867,202 with reference to FIG. 1.

A hinge 101 supports a yoke 102. The yoke 102 is rotable about a fulcrum axis 105 of the hinge 101. A mirror 103 is attached by a pillar 104 to the upper surface of the yoke 102, noting that, for a clear understanding of the structure of the Figure, the mirror 103 and yoke 102 are shown in a separated way. In symmetric positions with the hinge 101 as a center, two fixed electrodes (referred to also as address electrodes), thought not appearing in the Figure, are arranged at those fixed positions at a lower surface side of the yoke 102.

A drive circuit, not shown, supplies a voltage between either one of the fixed electrodes and the yoke 102 to create an electrostatic force. By doing so, the yoke 102 is driven, so that it is tilted toward a left (L) rotation or a right (R) rotation direction. The tilting of the yoke 102 means a variation of a mirror angle.

The drive circuit selects either of a first tilting direction and a second tilting direction. At a rate of a first tilting direction select period and a second tilting direction select period, modulation is imparted to light reflected by the mirror. The hinge 101 has three functions:

(1) In order to construct the spatial light modulator, the hinge 101 fixes each pixel forming mirror 103 and yoke 102 to a predetermined position.

(2) The hinge 101 provides a fulcrum for transforming a linear direction electrostatic force generated between the mirror 103 and yoke 102, on one hand, and the fixed electrode, on the other hand, to a rotation motion.

(3) The hinge 101 serves as a conductor for imparting a predetermined potential to the mirror 103 and yoke 102.

The hinge 101 performs an important function and, in order to be made movable under a small electrostatic force by applying a lower voltage, a hinge of small stress is demanded. In this case, however, a longer mechanical service life is also demanded even if it is rotated a very large number of times. Further, even if there is a history difference between the number of rotations in one direction and the number of rotations in the other direction, there is also a demand that no hysteresis occur in the hinge stress.

The hinge requires a high degree of technology. In order to enhance an aperture rate of the spatial light modulator, a two-level complicated structure is provided with a mirror 103 of a wider area mounted to cover the yoke 102 and hinge 101. Therefore, various kinds of pillars are required and hence a very complicated microstructure is provided.

As evident from the above, it is necessary to use a high degree of process control on the material and shape in the manufacture of this device and a very high degree of manufacturing technique.

BRIEF SUMMARY OF THE INVENTION

It is accordingly the object of the present invention to provide an induction charge mirror which makes a rotation mirror which is operated under an electrostatic force hinge-free and achieving a greater aperture rate in a simpler structure and the easiness with which it is manufactured.

In order to achieve the above-mentioned object of the present invention, there is provided an induction charge mirror comprising an insulating substrate; a space defined in an upper surface portion of the insulating material and surrounded at least its surface portion with an insulating material; a flat mirror conductor having an area smaller than a planar area of the space and tiltably set within the space; a transparent electrode surrounding the space and the upper side of the mirror conductor; first and second fixed electrodes arranged at a lower surface side of the space and situated opposite to each other relative to a position at which the area of the mirror conductor is bisected; means for normally applying a first potential to the transparent electrode; and means for alternately applying second and third potentials to the first and second fixed electrodes so as to switch the tilting angle of the mirror conductor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 8A to 8C are views for explaining a posture switching operation of the mirror conductor of the induction charge mirror of the present invention;

BRIEF DESCRIPTION OF THE INVENTION

The embodiments of the present invention will be described below with reference to the accompanying drawings.

Figure 1:
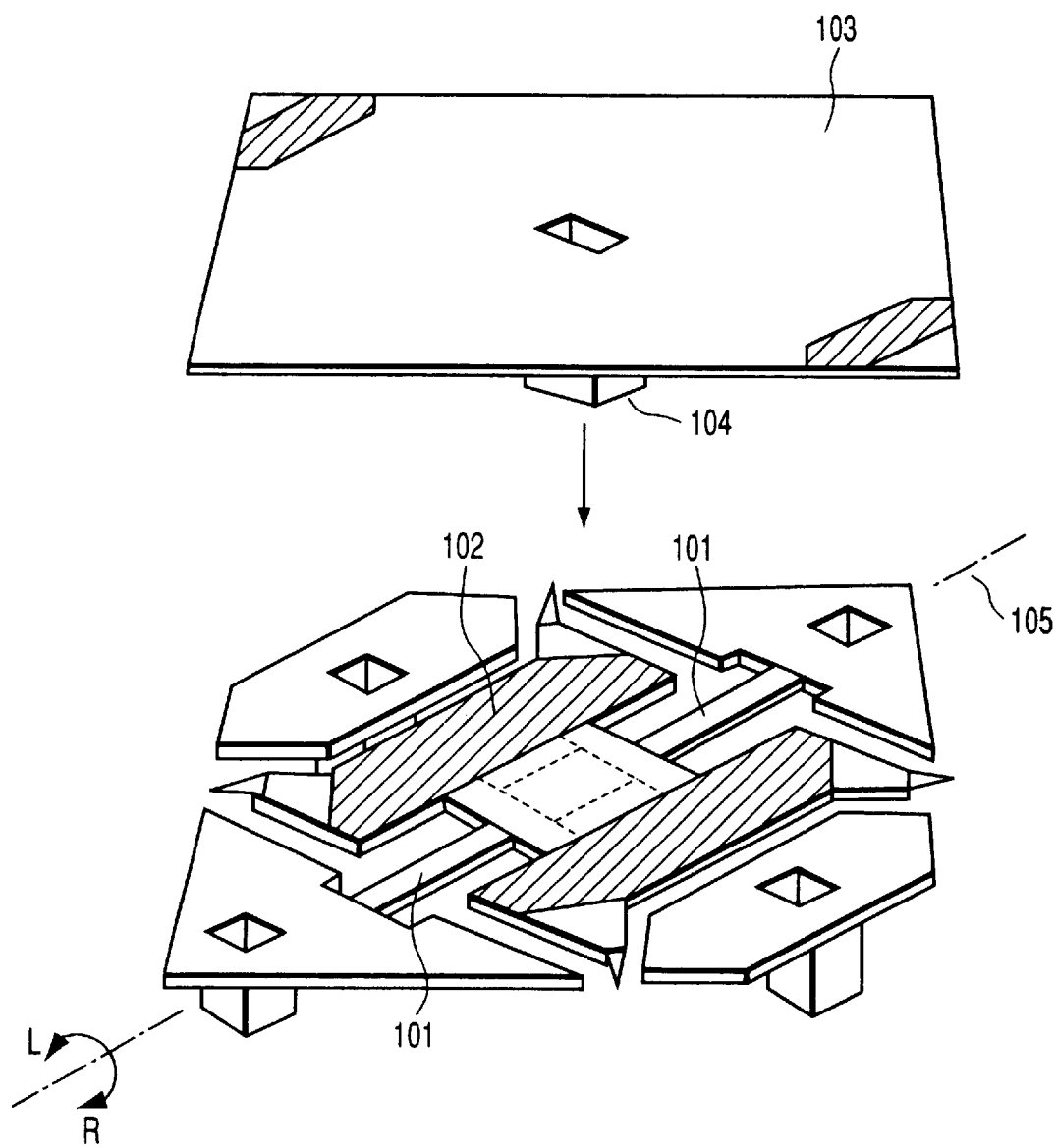
FIG. 1 is an exploded, perspective view showing a structure of a conventional induction charge mirror.
Figure 2:
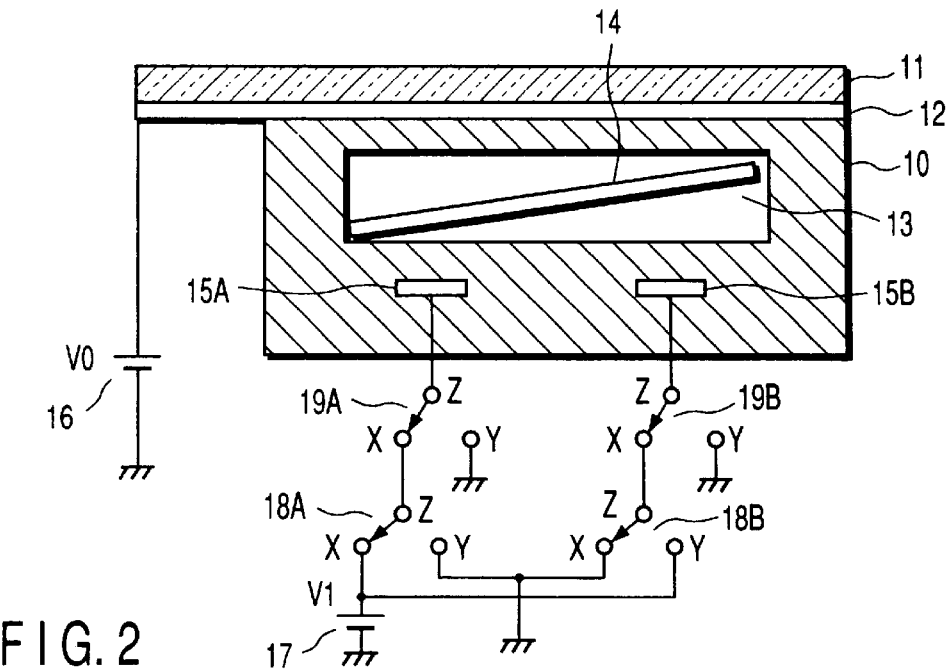
FIG. 2 is a transversal cross-sectional view for explaining a basic structure of a induction charge mirror according to one embodiment of the present invention.
Figure 3:
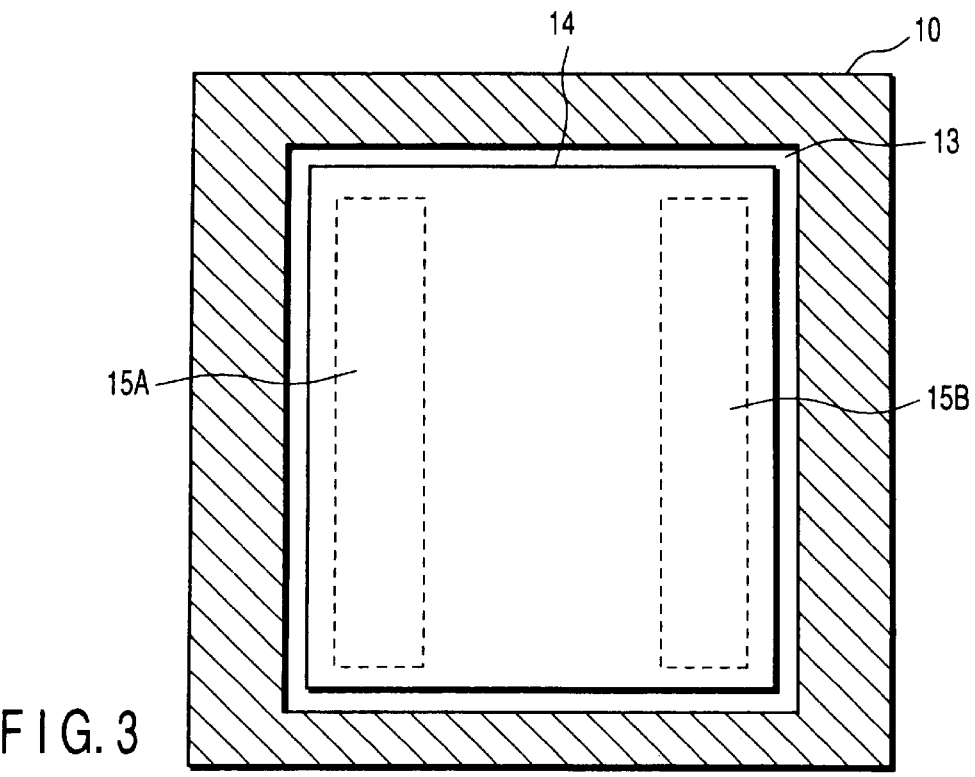
FIG. 3 is a cross-sectional view looking at the induction charge mirror of FIG. 2 form above.

FIG. 2 is a cross-sectional view showing a section of one pixel of one embodiment of the present invention. FIG. 3 is a cross-sectional view showing the section of this pixel viewed from above.

An insulating substrate 10 is constructed by an insulating material having a transparent sidewall at least on its upper side. A transparent electrode 12 is provided on the upper surface of the insulating substrate 10. A glass substrate 11 is provided on the upper surface of the transparent electrode 12. The glass substrate 11 protects the transparent electrode 12 and does not constitute an essential element of the present invention.

The insulating substrate 10 has a space 13. The space 13 is, for example, a square in a planar view and low in height. A mirror conductor 14 is arranged in the space 13 and is movable in up and down directions in the space 13. The mirror conductor 14 has a gap in the space 13.

At the lower side of the space 13, fixed electrodes 15A, 15B are arranged in a right/left symmetrical array in a spaced-apart relation.

An electrical drive means is constructed, for example, as will be set out below.

A voltage V0 from an external power source 16 is applied to the transparent electrode 12. A voltage V1 from a power source 17 is supplied to input terminals X and X of switches 18A and 18B and the associated input terminals Y and Y of the switches 18A and 18B are grounded.

The output terminals Z and Z of the switches 18A and 18B are connected to the input terminals X and X of switches 19A and 19B, respectively. The associated terminals Y and Y of the switches 19A and 19B are grounded. The output terminals Z and Z of the switches 19A and 19B are connected to the fixed electrodes 15A and 15B.

Although the switches 18A, 18B and switches 19A, 19B are set to a zero potential, these may be set to same potential except the zero potential. The switches 18A and 18B operate in a synchronized way and the switches 19A and 19B also operate in a synchronized way.

If, with the switches 19A and 19B selectively set to the terminals X and X, the switches 18A and 18B alternately select the terminals X and Y, then the mirror conductor 14 has its tilting direction switched in synchronism with this selective operation.

The basic operation principle of the present invention will be explained below.

First consider the case where the fixed electrodes 15A and 15B are set to the same potential (zero potential).

Figure 4:
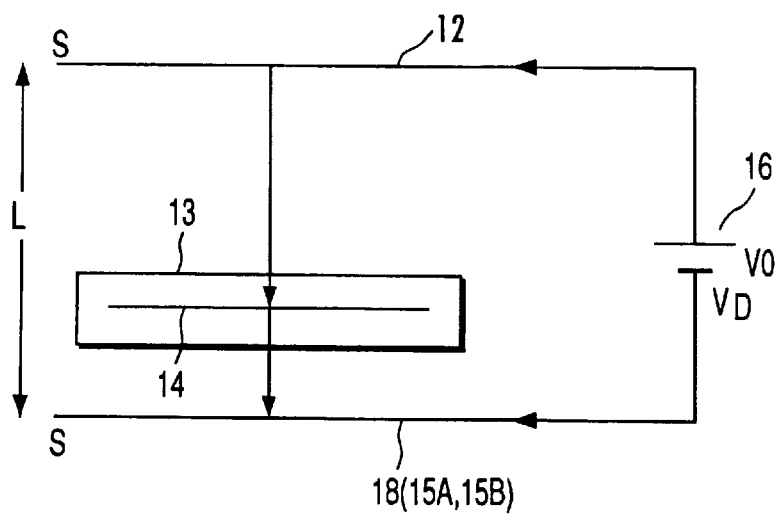
FIG. 4 is a view for explaining fixed electrodes 15A, 15B, 11 set at the same potential for ease in understanding a basic principle of the present invention.

FIG. 4 shows a state in which the fixed voltages 15A and 15B are both set to the zero potential. In FIG. 4, reference numeral 18 is used to show electrodes corresponding to the fixed electrodes 15A and 15B. In FIG. 4, the mirror conductor 14 is set to a parallel intermediate state within the space 13. If, at this time, the distance between the parallel transparent electrode 12 and the electrode 18 is represented by L, then an electric field $E = V0/L (V/m)$ is created between the electrode 18 and the transparent electrode 12.

Thus an electrostatic force of $1/2\epsilon 0\, E^2$ (N/m$^2$) is created on the surface of the mirror conductor 14 but the mirror conductor 14 is not moved because it is in equilibrium in the up and down directions. However, this state is unstable.

Figure 5:
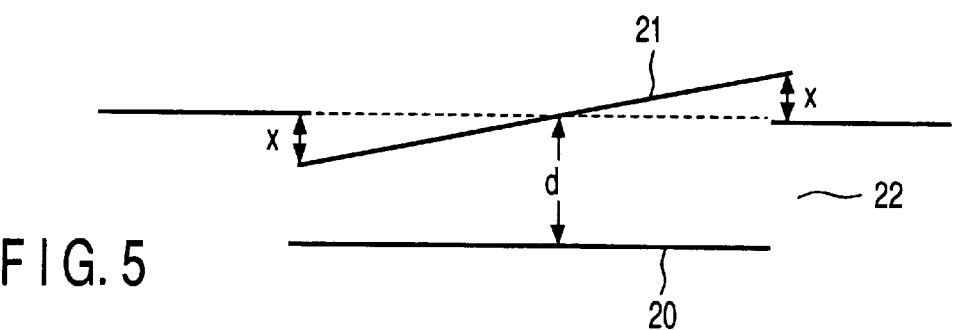
FIG. 5 is a view for explaining an electrostatic capacitance between flat conductors 21 and 20 for ease in understanding a basic operation of the present invention.
Figure 6:
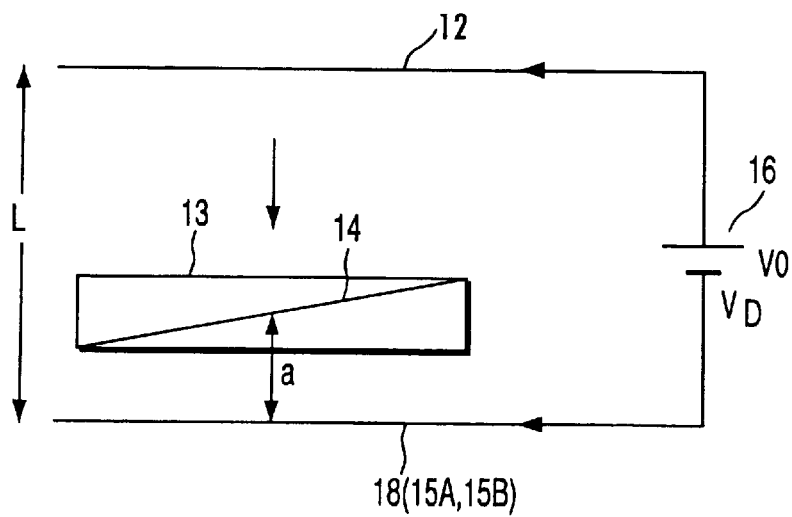
FIG. 6 is a view for explaining a posture latching operation of a mirror conductor 14 for ease in understanding the basic operation principle of the present invention.

FIG. 5 shows an example of a capacitor 22 constituted by flat conductors 20 and 21. The distance between the center of the flat conductor 21 and the flat conductor 20 is maintained to a level d. The flat conductor 21 is so set that it has a tilt of ±x at each side relative to a plane parallel to the flat conductor 20.

Now let the areas of the flat conductors 20 and 21 be given by S. Then the electrostatic capacitance C of the capacitor 22 is given by $C = (\epsilon_0 S/2x)\, \ln\,(1+x/d)/(1-x/d) \approx (\epsilon_0 S/d)\{1+(1/3)(x/d)^2+(1/5)(x/d)^4\}\,(F).$ From this equation it is evident that, with an increase of x, that is, an increase in tilt, the electrostatic capacitance is increased. This means that, when a potential is given from an outside to the electrodes, the electrostatic force is generated in an tilt increasing direction.

Thus, if a potential V0 is applied by an external power source across the transparent electrode 12 and the electrode 18, it follows that, within the insulated space 13, the mirror conductor 14 is tilted in either direction and set to a rest state. This is in a stable state. Thus, this operative state has a tilt retaining effect (mechanical latch). At this time, it is assumed that the center of the mirror conductor 14 and the electrode 18 are spaced by a distance a. Then the distance between the center of the mirror conductor 14 and the transparent electrode 12 is set to be L−a.

Here, in order to make a charge distribution on the up side of the mirror conductor 14 near-uniform, the distance between the mirror conductor 14 and the transparent electrode 12 is set to be adequately great compared with the distance between the mirror conductor 14 and the electrode 18 (15A, 15B). That is, L−a>a.

Then the tilting direction of the mirror conductor 14, that is, a posture switching operation, will be explained below with reference to FIGS. 7A, 7B and FIGS. 8A to 8C.

Figure 7A:
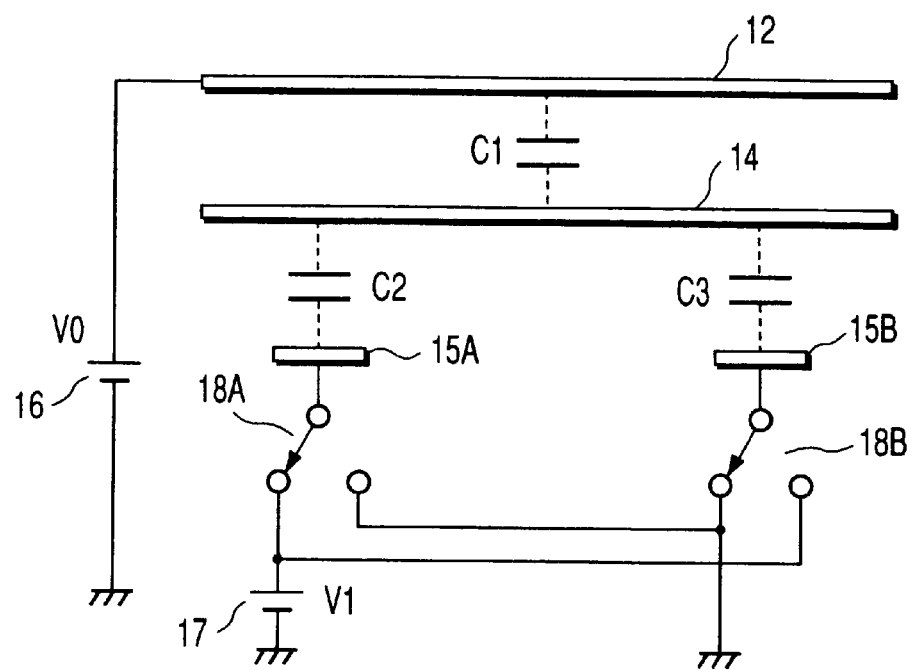
FIGS. 7A and 7B are views showing an electrostatic capacitance between electrodes in a cell of the induction charge mirror of the present invention.
Figure 7B:
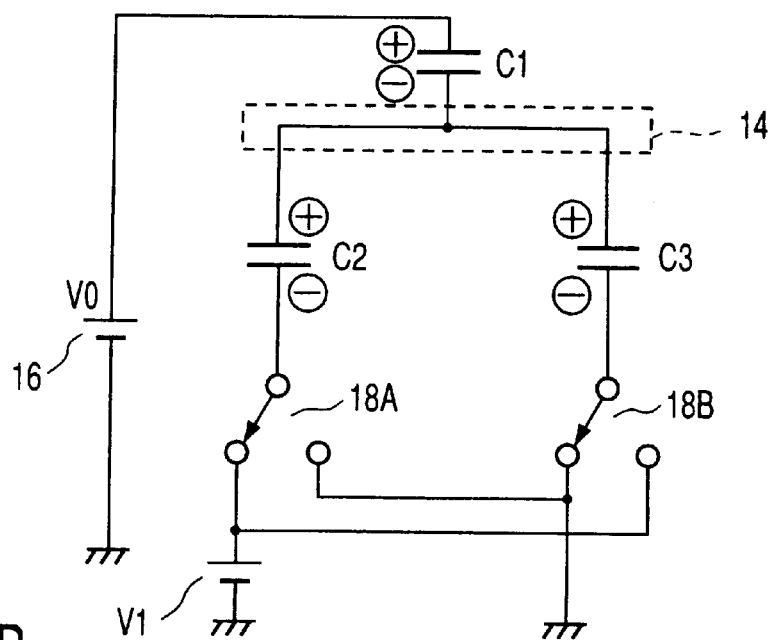

First, as shown in FIG. 7A, let an electrostatic capacitance between the mirror conductor 14 and the transparent electrode 12 be $C_1$ and electrostatic capacitances between the mirror conductor 14 and the fixed electrodes 15A, 15B be $C_2$ and $C_3$. Then an equivalent circuit is given as shown in FIG. 7B.

In order to make a charge distribution on the up side of the mirror conductor 14 near-uniform, the distance between the mirror conductor 14 and the transparent electrode 12 is set to be adequately great compared with the distance between the mirror conductor 14 and the fixed electrodes 15A, 15B.

Here, let the mirror conductor 14 be tilted toward the fixed electrode 15A side with the fixed electrodes 15A, 15B both set to be a zero potential as shown in FIG. 8A. From this state, a potential V1 is applied to the fixed voltage 15A as shown in FIG. 8B.

The electrostatic capacitance between the mirror conductor 14 and the transparent electrode 12 is given as $C_1$ and the electrostatic capacitances between the mirror conductor 14 and the fixed electrodes 15A, 15B are given as $C_2$, $C_3$. And the equivalent circuit is as shown in FIG. 7B.

In this state, induction potential V of the mirror conductor 14 is given as the following equation.

$$V=(C_1 V0 + C_2 V1)/(C_1+C_2+C_3)$$

Here, assume that a potential V0 is set by the external power source 16 so that the induction potential V=V1.

At this time, charges electrostatically induced in the mirror conductor 14 are such that the charges of respective electrostatic capacitances, if being given as $Q_1$, $Q_2$, and $Q_3$, become:

i $Q_1=C_1(V1-V0)$ i $Q_2=0$ i $Q_3=C_3 V1$

A negative charge $Q_1$ is generated on the up side of the mirror conductor 14 and, if the distance between the mirror conductor 14 and the transparent electrode 12 is set to be L−a>a, it provides a substantially uniform charge distribution.

Since, on the other hand, as shown in FIG. 8B, a potential V1 is applied by the power source 17 to the fixed electrode 15A and a potential V0 is also applied to the electrode 15B, a positive charge $Q_3$ is generated on the down side of the mirror conductor 14. Such positive charge are not made uniform and are strongly distributed on the fixed voltage 15B side. Since those charges generated in the mirror conductor 14 are electrostatically induced, their total sum becomes zero and hence $Q_1+Q_3=0$. By this charge, the up-side directing force is generated near-uniformly per unit area at the up side of the mirror conductor 14 and, if one half of the area of the mirror conductor is given as S, then an electrostatic force F corresponding to the one half is generated.

$$F=(Q_1)^2/(4\epsilon_0 S) \quad (N)$$

At the down side of the mirror conductor 14, on the other hand, charges $+Q_3$ are collected toward the side near the electrode 15B and a down-side-directing electrostatic force f is generated.

$$f=(Q_3)2/(2\epsilon_0 S) \quad (N)$$

Thus, at the fixed electrode 15A side, an up-side-directing force $$f_A=F(N)$$

and at the fixed electrode 15B side, a down-side-directing force $$f_B=F-f=-F \quad (N)$$

are generated. That is, by fA fB, a right-turning moment force in the Figure is generated and, as shown in FIG. 8C, the mirror conductor 14 has its fixed electrode 15B side changed to a down-directing state and stabilized. The potential v of the mirror conductor 14, being given as V, can generate a moment force if being in a predetermined range.

That is, as an approximate solution of the equivalent circuit, if $$Q_1=C_1(v-V0), Q_2=C_2(v-V) \text{ and } Q_3=C_3 v,$$

a condition under which an up-side-directing force acts toward the $C_2$ side is $$|Q_2|<(1/2)|Q_1|$$

and a condition under which a down-side-directing force acts toward the $C_3$ side is $$(1/2)|Q_1|<|Q_3|$$

In order to satisfy the above-mentioned conditions it is only necessary that the respective electrostatic capacitances $C_1$, $C_2$ and $C_3$ be set between the external power source 16, external power source 17 and mirror conductor 14 on one hand and the transparent electrode 12, fixed electrode 15A and fixed electrode 15B, on the other hand, respectively.

When, as set out above, the posture of the mirror conductor 14 varies from the state shown in FIG. 8A to the state shown in FIG. 8B, light which has been incident on a mirror on the surface of the mirror conductor 14 and then reflected therefrom travels from a direction referred to as a direction (ON) shown in FIG. 8A toward a direction (referred as a direction (OFF) shown in FIG. 8B.

In order to make the switching time the shortest, it is only necessary that a maximal electrostatic force be generated at a tilt state switching in FIG. 8B. That is, in this state, it is preferable to set a potential V0 so that V=V1.

At this time, $V0=V1 (C_1+C_3)/C_1$.

As explained in FIG. 4, after the switching of the tilt, even if the potential V1 of the fixed electrode 15A is set to zero (the fixed electrodes 15A and 15B are set to the same potential level and hence their electrode potentials may be set to V1 instead of zero), the same tilted state is maintained.

In the present invention, a potential is applied to the mirror conductor 14 by utilizing the electrostatic induction. Therefore, the potential of the mirror conductor 14 is also varied by varying the electrostatic capacitance $C_1$ between the mirror conductor 14 and the transparent electrode 12 and electrostatic capacitances $C_2$, $C_3$ between the mirror conductor 14 and the fixed electrodes 15A, 15B. In the case where the external power sources 16, 17 are so set as to achieve a maximal state by the switching of the tilting state for example, if the mirror conductor 14 happens to be brought to a parallel state the nearest to the fixed electrodes 15A, 15B, there may occur no generation of a moment force. In this case, there occur a state in which the electrostatic capacitance $C_1$ is decreased and the electrostatic capacitances $C_2$, $C_3$ are increased. Therefore, a reset operation is so done as to increase the potential V0 of the external power source 16 or to decrease the potential V1 of the external power source 17 and, by doing so, a tilted state is created and, thereafter, switching may be done to a normal operation. Or it may be possible that the value of the electrostatic capacitances $C_2$, $C_3$ are made not to increase to an excessive extent.

Figure 9A:
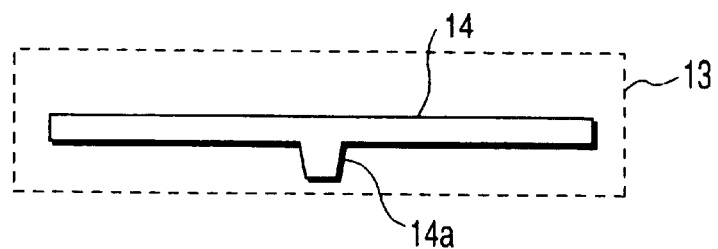
FIGS. 9A and 9B are views showing a practical structure of the mirror conductor 14 of an induction charge mirror according to another embodiment of the present invention and a practical form of a space 13 of an induction charge mirror according to another embodiment of the present invention.
Figure 9B:
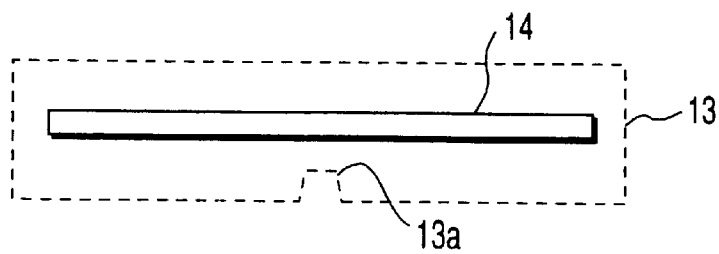

FIGS. 9A and 9B, each, show another embodiment of the present invention.

FIG. 9A is a practical form of mirror conductor 14 having a projection 14a near its middle area (near its rotation moment axis) at its lower surface side. FIG. 9B is a practical form in which a projection (stopper) 13a extends from a lower surface of a space 13 toward the neighborhood of a middle area (rotation moment axis) of a lower surface of a mirror conductor 14.

The projection 14a and stopper 13a serve to prevent a larger variation of electrostatic capacitances $C_2$, $C_3$ and do not serve as a rotation fulcrum. For this reason, they require no stricter accuracy.

When, in FIG. 2, as set out above, the switches 19A and 19B select the input terminals X and X, the switches 18A and 18B are switched to allow the potentials of the fixed electrodes 15A and 15B to be alternately switched and, by doing so, it is possible to switch the tilting of the mirror conductor 14. Further, if the fixed electrodes 15A and 15B are set to a predetermined potential with the switches 19A and 19B switched to the input terminal Y side, then the mirror conductor 14 retains its state.

The surface of the mirror conductor 14 provides a mirror and reflects incident light as indicated by a broken line in FIGS. 8A and 8C. If the mirror conductor 14 takes a posture as shown in FIG. 8A, the reflected light provides output light (ON). If the potential polarities of the fixed electrodes 15A and 15B are reversed and, by doing so, the mirror conductor 14 takes a posture as shown in FIG. 8C, the reflected light provides output light (OFF).

As set out above, if a potential V0 is applied to the transparent electrode 12, a potential v is generated on the mirror conductor 14 under an electrostatic induction and, if a potential V1 or 0 is applied to the fixed electrodes 15A, 15B, a moment force of any given sense can be generated in the mirror conductor 14.

The cell of the present invention exerts no influence on an intended operation even if its structure is made hinge-free. According to the present invention, the mirror conductor 14 is set within the insulating space 13 and the predetermined potentials are applied to the transparent electrodes 12 and fixed electrodes 15A, 15B. By doing so, the angle of the mirror is controlled by such a very simpler structure and it is possible to obtain an ON/OFF operation of light. Further, it is also easily possible to obtain a greater aperture rate by utilizing the insulating space 13, that is, by forming the insulating substrate 10 with a transparent resin.

Although, in the above-mentioned explanation, the mirror conductor 14 is used as an object to be set within the insulating space 13, since it is only necessary that an induction potential (charge) be imparted to the mirror conductor 14, the same effect is also obtained by insulating the mirror conductor 14.

If a metal mirror of about 10 to 30 $\mu$m is used as the mirror conductor 14, it is possible to obtain a posture switching speed of the order to $\mu$S even at V1=5 (V) and V0=10 to 20 (V). It may, therefore, be possible to form the switches 18A, 18B, 19A, 19B and fixed electrodes 15A, 15B by the use of a semiconductor chip and form an insulating space 13, mirror conductor 14 and transparent electrode 12 over a resultant structure.

Figure 10:
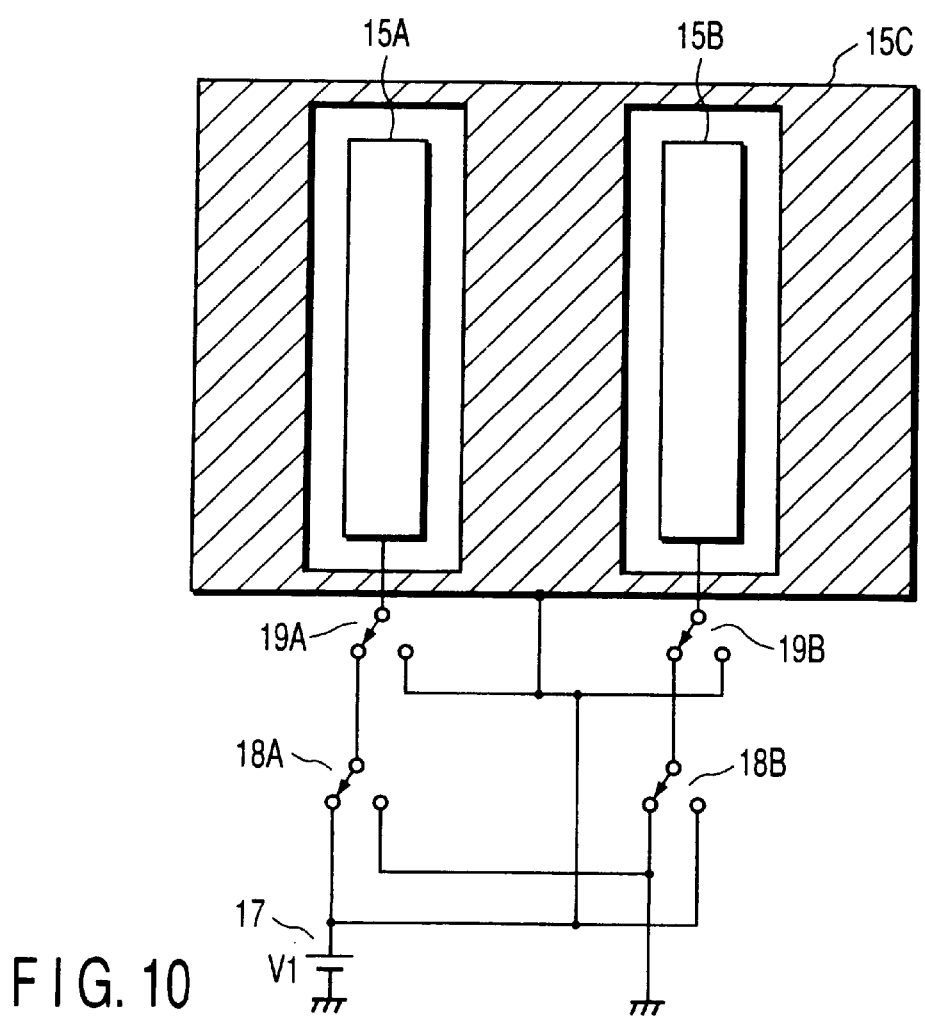
FIG. 10 is a view showing a induction charge mirror according to another embodiment of the present invention.

FIG. 10 shows another embodiment of the present invention. This Figure shows a practical structure in which, a the fixed electrode (15A, 15B) side, a fourth electrode 15C is provided to surround these fixed electrodes 15A, 15B. As explained above, the basic operation of the induction charge mirror of the present invention is performed by properly switching the potentials to the fixed electrodes 15A, 15B. The electrode 15C is maintained to a predetermined potential and, in FIG. 10, connected to a power source 17 and set to a potential V1. At this time, the electrode 15C is not directly conducive to the tilt switching operation of the mirror conductor 14 but it effective to the electrostatic shield for reducing an influence from an adjacent similar structure (cell). That is, the induction charge mirror of this invention can, in addition to the fixed electrodes 15A, 15B, add, for example, the electrode 15C.

Figure 11:
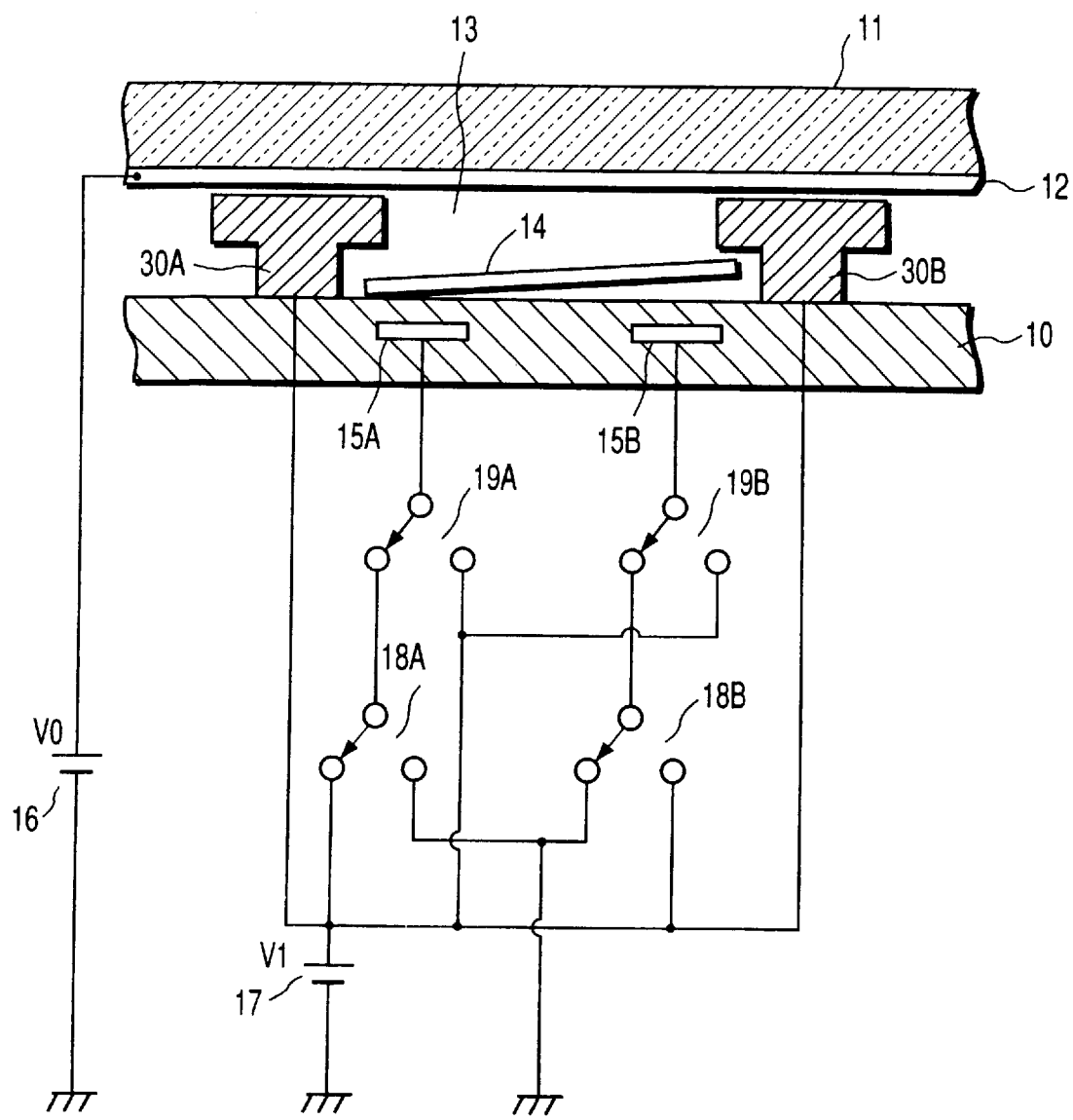
FIG. 11 is a view showing an induction charge mirror according to another embodiment of the present invention.

FIG. 11 shows another embodiment of the present invention.

The basic structure of a transparent electrode 12, mirror conductor 14 and underlying fixed electrodes 15A, 15B is the same as the embodiment shown in FIG. 2. Therefore, the same reference numerals are employed here to designate parts or elements corresponding to those shown in FIG. 2. This invention is different from the embodiment of FIG. 2 in that, in place of the insulating space 13 of FIG. 2, a space 13 is defined by conductor partition walls 30A, 30B with a mirror conductor 14 set in the space 13. The conductor partition walls 30A, 30B are given a potential V1 of a power source 17 so as to be set to be higher than the potential V0. If, in this structure, the mirror conductor 14 is contacted with the conductor partition walls 30A, 30B, then the power source 17 is electrically connected to the mirror conductor 14 to provide the potential V1 to the mirror conductor 14. If, on the other hand, the mirror conductor 14 is not contacted with the conductor partition walls 30A, 30B, then a potential is given under an electrostatic induction due mainly to the transparent electrode 12 and fixed electrodes 15A, 15B and the tilt switching operation of the mirror conductor 14 is performed as set out earlier above.

Figure 12:
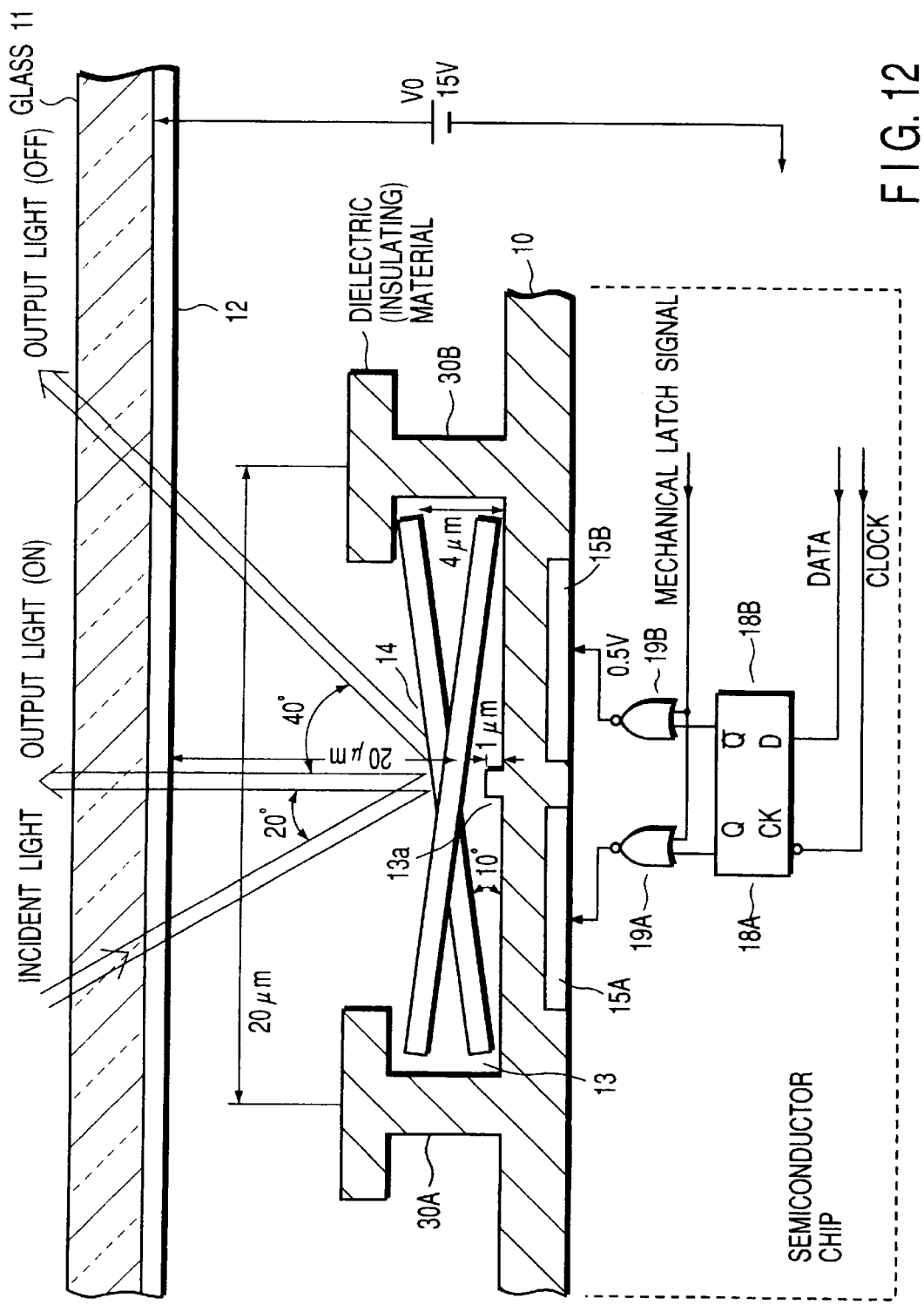
FIG. 12 is a view showing an induction charge mirror according to another embodiment of the present invention.

FIG. 12 shows an equivalent structure in which, in the embodiment shown in FIG. 11, a semiconductor chip is so configured as to have a drive circuit attached to a rear surface of an insulating substrate 10. FIG. 12 also shows the dimension of each parts and detailed angle values.

Fixed electrodes 15A, 15B are formed by a pattern printing for example, in the rear surface of the insulating substrate 10. Further, a linear projection 13a is formed at a middle portion of the bottom surface of the space 13 and a design consideration is given there to prevent a mirror conductor 14 from being moved closer to a inner bottom surface of the space 13 to a more than necessary extent. In FIG. 12, the mirror conductor 14 is shown as being tilted at an angle 10° with its end moved by a distance 4 $\mu$m. Also shown in FIG. 12, for example, an angle between incident light and the light reflected by a conductor (metal mirror) 14. The angle is 20° for the output light (ON) and 60° for the output light (OFF). The distance from the center of the mirror conductor 14 to a transparent electrode 12 is 20 $\mu$m.

Switches 18A, 18B are comprised of a D type flip-flop with its non-inverting output Q and inverting output $\overline{Q}$ connected to the input terminals X of NOR circuits 19A and 19B (corresponding to the switches 19A and 19B of the earlier embodiment), respectively. At a time of a mechanical signal "0", the outputs of the D type flip-flop are supplied to the electrodes 15A and 15B. In order to obtain output light (ON), the data is set to "1" and, in order to obtain output light (OFF), the data is set to "0".

In order to make both the electrodes 15A and 15B at the same potential, the mechanical latch signal is set to a high level "1" and, irrespective of the data, the mirror conductor retains a predetermined tilt.

As set out above, according to the present invention, an induction charge mirror can be provided which makes a rotation mirror which is operated under an electrostatic force hinge-free and achieve a greater aperture rate in a simpler structure and the easiness with which it is manufactured.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An induction charge mirror comprising:
   an insulating substrate;
   a space defined in an upper surface portion of the insulating substrate and surrounded at least its surface portion with an insulating material;
   a flat mirror conductor having an area smaller than a planar area of the space and tiltably set within the space;
   a transparent electrode covering the space and upper side of the mirror conductor;
   first and second fixed electrodes arranged at a lower surface side of the space and situated opposite to each other relative to a position at which the area of the mirror conductor is bisected;
   means for normally applying a first potential to the transparent electrode; and
   means for alternately applying second and third potentials to the first and second fixed electrodes so as to switch a tilting angle of the mirror conductor,
   wherein the distance between the mirror conductor and the transparent electrode is set to be greater than that between the mirror conductor and the first and second fixed electrodes.

2. An induction charge mirror according to claim 1, wherein, if the second potential applied to the first fixed electrode is represented by V1 and an electrostatic capacitance between the transparent electrode and the mirror conductor is represented by C1 and an electrostatic capacitance between the mirror conductor and the second fixed electrode is represented by C3, the first potential given by V0 and applied to the transparent electrode is so set as to be given below:

$$V0=V1\ (C1+C3)/C1.$$

3. An induction charge mirror according to claim 1, wherein a projection stopper is provided near a middle of a lower surface of the mirror conductor or near a middle of the fixed electrode-side surface of the space.

4. An induction charge mirror according to claim 1, wherein a third fixed electrode is so provided as to surround the first and second fixed electrodes in a spaced-apart relation and has a shielding effect.

5. An induction charge mirror according to claim 1, wherein the means for alternately applying second and third potentials to the first and second fixed electrodes is provided on a semiconductor chip attached to a rear surface of the insulating substrate.

6. An induction charge mirror according to claim 1, wherein the transparent electrode is provided on a glass substrate.

7. An induction charge mirror according to claim 1, wherein the space is wholly surrounded with the insulating material.

8. An induction charge mirror according to claim 7, wherein a third fixed electrode is so provided as to surround the first and second fixed electrodes in a spaced-apart relation and has a shielding effect.

9. An induction charge mirror according to claim 7, wherein the means for alternately applying second and third potentials to the first and second fixed electrodes is provided on a semiconductor chip attached to a rear surface of the insulating substrate.

10. An induction charge mirror according to claim 7, wherein the space is wholly surrounded with the insulating material.

11. An induction charge mirror according to claim 1, wherein the space is surrounded with the insulating material and conductors.

12. An induction charge mirror comprising:
    an insulating substrate;
    a space defined at an upper surface portion of the insulating substrate and surrounded at least its surface portion with an insulating material;
    a flat mirror conductor having an area smaller than a planar area of the space and tiltably set within the space;
    a transparent electrode covering the space and upper side of the mirror conductor; first and second fixed electrodes arranged on a lower surface side of the space and situated opposite to each other relative to a position at which the area of the mirror conductor is bisected;
    first means for normally applying a first potential to the transparent electrode;
    second means alternately applying second and third potentials to the first and second fixed electrodes so as to switch a tilting angle of the mirror conductor; and
    third means for simultaneously applying a fourth potential to the first and second fixed electrodes so as to retain a tilting angle of the mirror conductor,
    wherein the distance between the mirror conductor and the transparent electrode is set to be greater than that between the mirror conductor and the first and second fixed electrodes.

13. An induction charge mirror according to claim 12, wherein at least the second and third means are provided on a semiconductor chip attached to a rear surface of the insulating substrate.

14. An induction charge mirror according to claim 12, wherein, if the second potential applied to the first fixed electrode is represented by V1 and an electrostatic capacitance between the transparent electrode and the mirror conductor is represented by C1 and an electrostatic capacitance between the mirror conductor and the second fixed electrode is represented by C3, the first potential given by V0 and applied to the transparent electrode is so set as to be given below:

$$V0=V1\ (C1+C3)C1.$$

15. An induction charge mirror according to claim 12, wherein a projection stopper is provided near a middle of a lower surface of the mirror conductor or near a middle of the fixed electrode-side surface of the space.

16. An induction charge mirror according to claim 12, wherein a third fixed electrode is so provided as to surround the first arid second fixed electrodes in a spaced-apart relation and has a shielding effect.

17. An induction charge mirror according to claim 12, wherein the transparent electrode is provided on a glass substrate.

18. An induction charge mirror according to claim 12, wherein the space is wholly surrounded with the insulating material.

19. An induction charge mirror according to claim 12, wherein the space is surrounded with the insulating material and conductors.

20. An induction charge mirror comprising:
    an insulating substrate;
    a space defined in an upper surface portion at the insulating substrate and surrounded at least at its surface portion with an insulating material;

a flat mirror conductor having an area smaller than a planar area of the space and tiltably set within the space;

a transparent electrode covering the space and upper side of the mirror conductor;

first and second fixed electrodes arranged at a lower surface side of the space and situated opposite to each other relative to a position at which the area of the mirror conductor is bisected;

means for normally applying a first potential to the transparent electrode; and means for alternately applying second and third potentials to the first and second fixed electrodes so as to switch a tilting angle of the mirror conductor, wherein, if the second potential applied to the first fixed electrode is represented by V1 and an electrostatic capacitance between the transparent electrode and me mirror conductor is represented by C1 and an electrostatic capacitance between the mirror conductor and the second fixed electrode is represented by C3, the first potential given by V0 and applied to the transparent electrode is so set as to be given below:

$$V0=V1\ (C1+C3)/C1.$$

21. An induction charge mirror according to claim 20, further comprising:

means for simultaneously applying a fourth potential to the first and second fixed electrodes so as to retain a tilting angle of the mirror conductor.

22. An induction charge mirror according to claim 20, wherein a projection stopper is provided near a middle of a lower surface of the mirror conductor or near a middle of the fixed electrode-side surface of the space.

23. An induction charge mirror according to claim 20, wherein the transparent electrode is provided on a glass substrate.

24. An induction charge mirror according to claim 20, wherein the space is surrounded with the insulating material and conductors.

* * * * *